Oct. 17, 1967

G. F. HUGHES 3,347,331

AIR CUSHION VEHICLE

Original Filed Feb. 28, 1964

INVENTOR.
GEOFFREY F. HUGHES
BY *Price & Heneveld*
ATTORNEYS

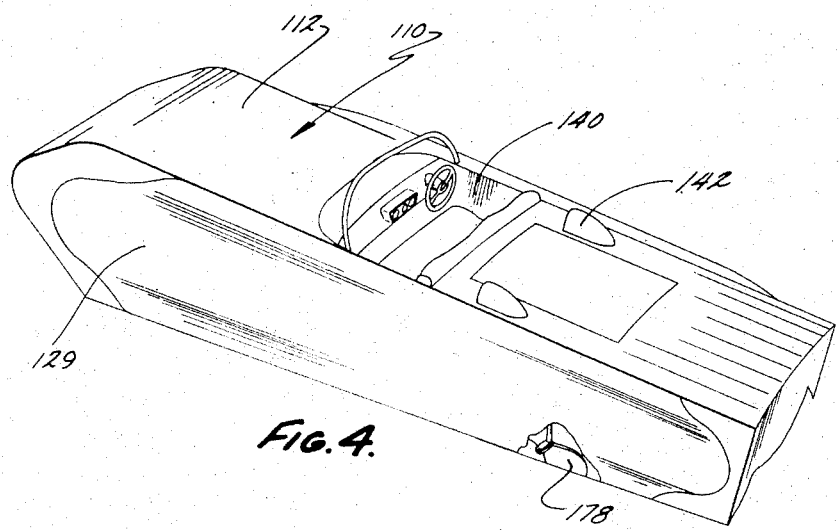
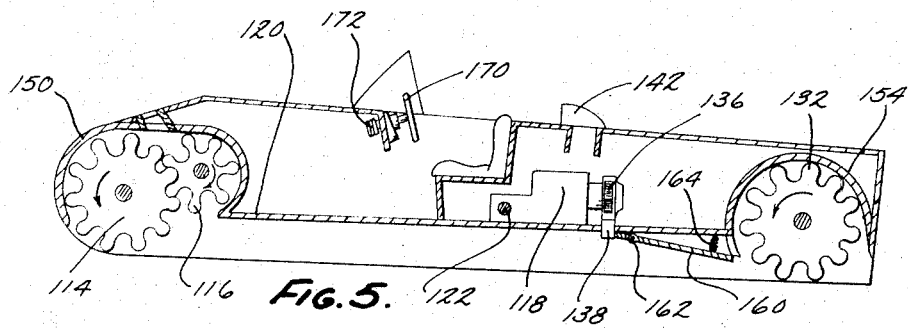
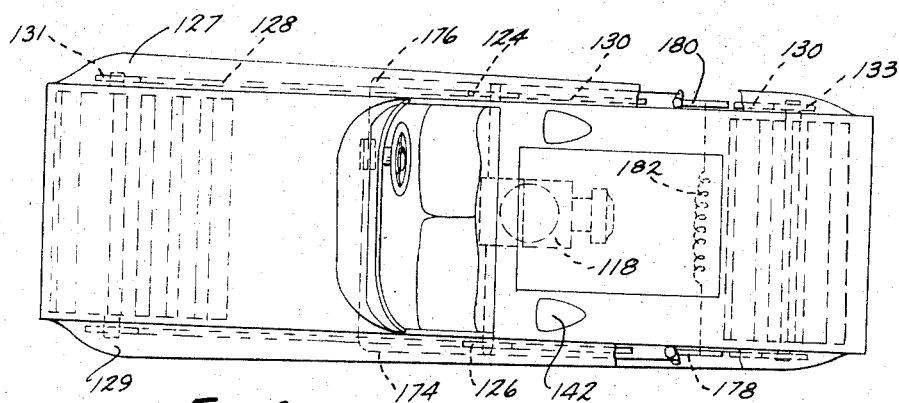

Oct. 17, 1967      G. F. HUGHES      3,347,331
AIR CUSHION VEHICLE

Original Filed Feb. 28, 1964      3 Sheets-Sheet 3

INVENTOR.
GEOFFREY F. HUGHES
BY
ATTORNEYS

United States Patent Office 3,347,331
Patented Oct. 17, 1967

3,347,331
AIR CUSHION VEHICLE
Geoffrey F. Hughes, 1109 Lakeside SE.,
Grand Rapids, Mich. 49506
Original application Feb. 28, 1964, Ser. No. 348,092, now Patent No. 3,272,270, dated Sept. 13, 1966. Divided and this application June 6, 1966, Ser. No. 566,441
2 Claims. (Cl. 180—7)

ABSTRACT OF THE DISCLOSURE

An air cushion supported land vehicle employing front mounted elongated, intermeshed, gear wheels to enclose the front of the air cushion chamber and constituting an air pressure generating means, combined with driving track means.

---

This application is a divisional application of the parent application entitled Air Cushion Vehicle, filed February 28, 1964, Serial No. 348,092 by Geoffrey F. Hughes, now U.S. Patent No. 3,272,270.

This invention relates to air cushion vehicles, and more particularly to a surface vehicle supported on an air cushion in a manner making the vehicle especially suitable for operation over water, even rough water. The invention is also applicable in its broader aspects to a land vehicle.

Although air cushion vehicles are presently employed to some extent under operational conditions, there are definite fundamental disadvantages associated with these present vehicles. These disadvantages include (1) high power requirements to sustain the air pressure upon which the vehicle rides, and (2) an inability of the vehicles to move efficiently over rough water.

It is therefore an object of this invention to provide a completely different and unique air cushion vehicle support and drive system which enables a vehicle to be suspended and driven with relatively small power requirements, and even enables the vehicle to efficiently traverse rough water.

It is another object of this invention to provide a vehicle air cushion suspension system useful for both land and water vehicles, but especially suited for traversing water, even rough water, without breaking the seal between the vehicle shell and the surface, by continuously enclosing the pressure area containing the air cushion.

It is another object of this invention to provide an air cushion vehicle having an entrapped air cushion in a special chamber under a substantial portion of the vehicle, to achieve a buoyant effect.

Another object of this invention is to provide an air cushion vehicle having a dynamic pumping action at the front of the vehicle, and also preferably at the rear of the vehicle, to maintain the enclosed air suspension cushion while simultaneously effecting forward propulsion with either the same support unit or by an auxiliary drive mechanism.

Still another object of this invention is to provide an air cushion vehicle support system capable of operation effectively in either small boats used for sport or pleasure, or in larger boats and ships.

These and several other objects of this invention will become apparent upon studying the following specification in conjunction with the drawings in which:

FIG. 4 is a perspective view of the second form of the invention in the form of a water vehicle;

FIG. 5 is a sectional view of the vehicle in FIG. 4;

FIG. 6 is a plan view of the vehicle in FIG. 4;

Figure 1:
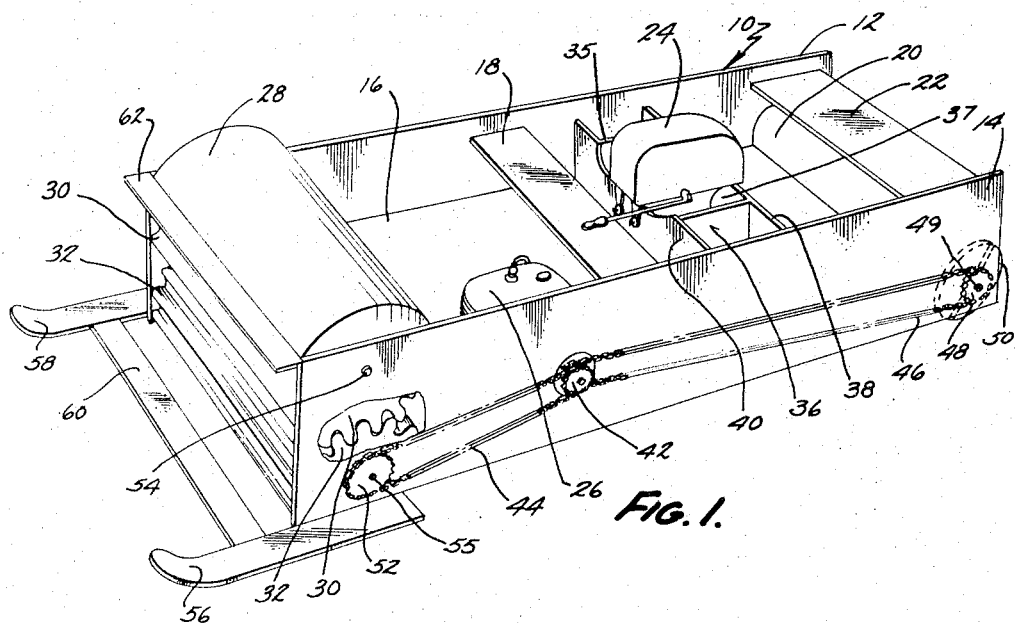
FIG. 1 is a perspective view of one form of the vehicle comprising a water vehicle.

Referring now specifically to the drawings, the water vehicle 10 illustrated in FIG. 1 is the basic original craft which was successfully operated over a period of time on a body of water. The vehicle has a frame enclosed by a pair of side panels 12 and 14 spaced from each other in parallel fashion. Rotatably mounted between the panels on axles 54 and 55 at the front end of the boat is a pair of intermeshed elongated gear wheels 30 and 32. The gear wheels are of lightweight, yet robust construction, being either of a thin metallic shell, or a plastic skin over a skeletal frame, or a foam plastic, to be as light as possible. Each of the gears has a plurality of teeth having a heavily undercut involute contour.

Extending over the upper surface of the upper wheel 30 is a shroud 28 of curved configuration to provide a close fit to the teeth edge of gear 30, thereby cooperating with the wheels to form a pumping action. The forwardly extending overhanging flange or shield 62 extends from shroud 28 to prevent water spray from being excessive up over the boat during operation. The shroud blends with a rearwardly extending, generally horizontal panel 16 that seals off the area between the two side panels 12 and 14 to define a buoyant chamber 15. This chamber extends under a major portion and substantially all of the craft. The rear end of this chamber is enclosed by sealing means, preferably in the form of a revolvable wheel. This wheel may take the form of the paddle wheel 50 illustrated in FIGS. 1 through 3, including a pair of end discs and a plurality of elongated, radially extending paddles 51. Alternatively, it may take the form of a gear wheel like that illustrated in FIG. 5. In fact, as will be explained hereinafter, for a small water craft, it can take the form of a downwardly, rearwardly extending ramp.

The structure of the craft may vary considerably. In the form of the invention illustrated in FIGS. 1 through 3 the side panels are strengthened and interconnected by a seat 18, as well as a rear deck portion 22. Beneath this rear deck is a second shroud 20 which cooperates with rear wheel 50 to form a pumping action in a manner to be explained hereinafter.

Also mounted between the side panels is a bulkhead formed by a pair of laterally extending spaced plates 38 and 40. These plates are interconnected by a pair of rearwardly extending vertical elements 35 and 36. The four plates thus form a central well 37 which extends down through chamber 15 in a manner to prevent loss of air from the chamber. This well receives the downwardly extending drive portion of an outboard motor 24 mounted on the front panel 40 by clamp 41 in conventional fashion. It will be recognized from this description to follow hereinafter that this auxiliary motive force for propulsion need not always be used, but preferably is used on smaller craft. This outboard motor has a conventional construction, except that it has an extra long shaft to rudder 70 and prop 72, to extend beneath the vehicle. The thrust line of this engine preferably is slightly upwardly and forwardly toward the central portion of chamber 15. It has been found that this serves most effectively and efficiently, especially during initial operation to lift the boat to the water surface.

Figure 2:
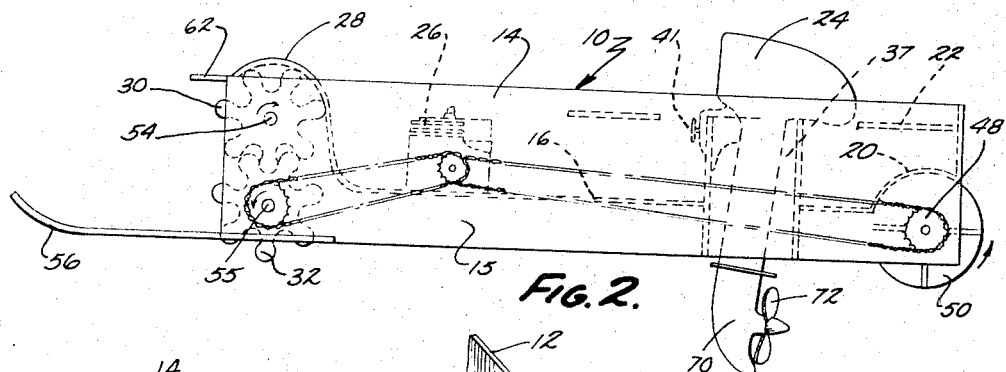
FIG. 2 is a side elevational view of the vehicle in FIG. 1.
Figure 3:
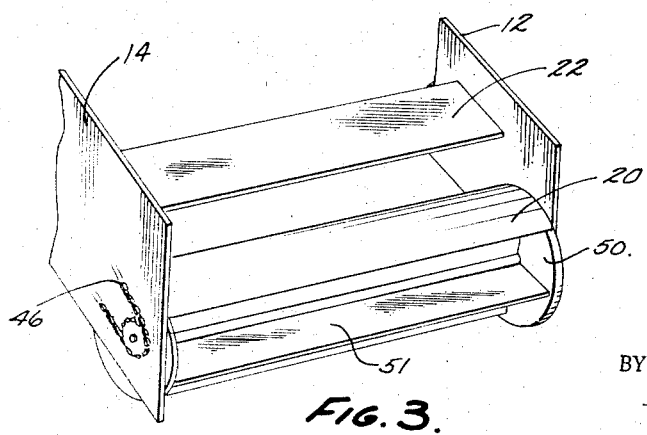
FIG. 3 is an enlarged perspective fragmentary view of the rear of the vehicle in FIGS. 1 and 2.

In the form of the invention illustrated in FIGS. 1, 2, 3, a power motor means in the form of an internal combustion engine 26, is mounted above panel 16 to provide driving force for the front and rear wheels. Its output shaft extends beyond side panel 14 where sprockets 42 are attached for interconnection with drive chains 44 extending to the front of the boat and 46 to the rear of the boat. Chain 44 engages a bracket 52 on shaft 55 of wheel 32. Rotation of wheel 30 causes rotation of wheel 32. With operation of engine 26, wheel 30 rotates in a counterclockwise direction as viewed in FIG. 2 and wheel 32 rotates in a clockwise direction. Drive chain 46 likewise interengages sprocket 48 on shaft 49 for wheel 50, to drive this wheel in a counterclockwise direction as viewed in FIG. 2.

In the form of the invention illustrated in FIG. 1, it was found preferable to have means on the front of the boat to prevent damage to the wheels when the boat was beached. Consequently, a pair of skis 56 and 58 were attached to the boat and braced by the transverse element 60. It will be realized, of course, that many modifications of this particular ramping structure can be utilized to prevent damage to the wheels upon beaching. In fact, in many instances this protective structure is not necessary at all.

It was found during actual operation and testing of this construction that the vehicle operated very satisfactorily. The model first tested was 4' wide and 14½' long between centers, providing a total lift area of 58 square feet. Sixteen inch diameter forward wheels were driven by a 3-horsepower gasoline engine 26, and had a tooth depth of 4". In tests, the rear wheel was allowed to freely idle. It was found that the boat could be effectively operated when the rear wheel was free. However, the lift at the rear of the boat is not as great when the rear wheel is free wheeling. The outboard motor was used for additional forward thrust during operation. The vehicle could move across water at speeds up to 20 m.p.h. with no difficulty whatever. The lift provided to it effectively caused the vehicle to skim across the water, even when the water was relatively rough. In fact, rough water tests were conducted under conditions of up to 30 m.p.h. winds and 12" wave heights from trough to crest. The vehicle exhibited a remarkable smoothness in ride under all conditions and a clear ability to maintain air pressure in the buoyant chamber. This was true even when rough water conditions caused wave height to exceed tooth depth. The vehicle exhibited remarkable stability and operative efficiency. This in spite of the fact that small engines were used to provide buoyant force and propulsion.

In the form of the invention illustrated in FIGS. 4 through 6, vehicle 110 includes a hull 112 formed of a pair of side panels interconnected by a front deck and a rear deck. This vehicle includes a pair of interengaged front gear wheels 114 and 116 rotatably mounted on parallel rotation axes to the side panels of the boat. In this instance, it has been found satisfactory to have upper gear wheel 116 displaced rearwardly behind lower gear wheel 114, and is of smaller diameter. It effectively performs its pumping operation into chamber 115. The gear wheels are of lightweight construction, and have deeply undercut involute tooth form. Rearward displacement of the upper wheel allows a lower silhouette for the vehicle, while enabling the use of a larger lower gear wheel with larger tooth depth. It has been found that tooth depth variation is important to accommodate the type of water involved. The higher the normal wave encountered, the deeper the tooth depth should be. With this larger craft illustrated in FIGS. 4, 5 and 6, an air-cooled engine 118 similiar to the type used to presently power Corvair automobiles is mounted above panel 120. This panel closes off buoyant chamber 115 beneath the craft. The output of this engine to shaft 122 drives the sprocket wheels or pulleys 124 and 126, which in turn drive chains or belts 128 and 130. These belts drive pulleys 131 and 133 on the forward wheels 114 and 116 and rear wheel 132, respectively. This drive assembly is enclosed by a pair of fenders 127 and 129. The rear wheel is likewise rotatably mounted on the craft.

In this heavier form of the craft, engine 118 also preferably drives a blower 136 having its outlet 138 into chamber 115. This provides an auxiliary compressed air supply to supplement the action of wheels 114, 116 and 132 to provide lift and facilitate maneuverability at low speeds. In the central section of the boat is a passenger compartment 140. Behind the passenger compartment is a pair of air scoops 142 to supply cooling air to engine 118, which is shrouded. A centrifugal fan is used for cooling it in conventional fashion. The exhaust of this cooling air and the engine exhaust is vented into the buoyant chamber for additional lift.

The forward end of the boat includes a shroud 150 which extends around a portion of the periphery of the gear wheels, and especially has close peripheral relationship to wheel 116 so that it will act as a pumping element. The rear shroud 154 extending around the upper portion of the periphery of rear gear wheel 132 likewise has a close interfit with this gear wheel to provide a pumping action.

Preferably, immediately ahead of the rear wheel is a downwardly, rearwardly diagonally slanted ramp 160. This ramp is a plate which extends from side to side across the vehicle to effect a lift action on the rear of the vehicle as it moves across the water. It has been found that, when used in combination with rear gear wheel 132, this plate may be rigidly mounted in the position roughly illustrated in FIG. 5. However, it is often preferable to mount this unit on a front pivotal axis 162 and with bias means such as coil spring 164 biasing the rearward portion downwardly. This allows normal water force applied to this ramp to provide lift to the rear end of the boat. Yet, when excessive pressure strikes this ramp due to wave fronts passing beneath the boat, the ramp can flex upwardly against the compression of the spring to temporarily deflect and move over the wave front. This allows the vehicle to ride smoothly without losing the air seal of the chamber due to waves passing beneath the boat. It has been found that with lightweight boats such as those used on inland lakes by sportsmen, the rear wheel can be dispensed with completely when this pivotally mounted, biased ramp is used on the rear of the vehicle.

The vehicle illustrated in FIGS. 4, 5 and 6 is navigated by utilizing a steering mechanism which includes steering wheel 170, pulleys 172 attached to the steering shaft, and steering cables 174 and 176 which extend to rudder elements 178 and 180, respectively. These rudder elements are each mounted on a vertical axle. The rudders are interconnected by a tension coil spring 182. Each rudder can move outwardly from the boat, but cannot move inwardly toward the boat past the position illustrated in FIG. 6. Turning of the steering wheel to turn left therefore, pulls cable 174 to pivot rudder 178 around its front pivotal mount and create a water drag on the left side of the boat and permitting air spillage, creating a sideward and turning thrust. Rudder 180 does not move since spring 182 merely stretches out with turning of rudder 178. A similar action occurs with respect to the opposite rudder.

*Operation of the water vehicle*

To operate the form of the water vehicle illustrated in FIGS. 1, 2 and 3, gasoline engine 26 is started to drive chains 44 and 46. Alternatively, if rear wheel 50 is allowed to free wheel, only chain 44 is driven. This drives the appropriate sprockets to revolve the front wheels 30 and 32. Since front wheel 32 revolves in a counterclockwise direction, the edges of the teeth skim over the water surface. During initial starting however, these teeth are slightly immersed in the water. Consequently, outboard engine 24 is started to move the vehicle forward with a slight upward thrustline to lift the front lower gear wheel 32 to the surface of the water. Meanwhile, clockwise revolution of gear wheel 30 pumps air in between its teeth and shroud 28 to chamber 15. This air is entrapped in this chamber to create a pressurized buoyant lifting force. Actual manometer measurements have shown this force to be very significant and constant in this chamber. As the craft moves across the water under propulsion of the revolving gear wheels, and supplemented by the auxiliary source (such as the outboard motor 24 or an equivalent air propeller of conventional type), the rear wheel also revolves. Revolution of the rear wheel causes air to be pumped between its vanes and shroud 20 to chamber 15. If the rear wheel is allowed to free wheel, the drag of the water along the low edge of the rear wheel causes it to revolve. Any escape of the air beneath the lower surface of the rear wheel creates an additional forward thrust effect on the vessel. During operation, the air in chamber 15 is continually kept compressed, to have a buoyant action. The lower edges of the side panels move across the surface of the water and retain the seal intact. The vehicle has been shown to be capable of moving transversely to the waves, diagonally with respect thereto, or coaxial therewith with equal facility and stability. The degree of rough water which can be traversed is only limited by the relative tooth size for the revolving gear wheels.

During operation of the form of the invention illustrated in FIGS. 4, 5 and 6, the driving action for forward propulsion, as well as the buoyant action, is achieved by the revolving gear wheels. The substantial tooth depth creates a water-wheel pulling and pushing action across the water surface, as well as creating the air pumping action into the chamber 115. This is possible because of the relatively larger size of engine 118 used as the power supply. Part of the buoyant action is also provided by the auxiliary air source fan 136.

The particular size and weight of the vehicle does not seem to be a limitation to this mode of operation, since the size of the gear wheels, their tooth depth, and the size of the power supply can be readily changed to accommodate the increased weight and size to be transported.

It will be realized that the double wheel assembly at the front of the vehicle is essential since a single wheel would act oppositely, tending to pump air out of the chamber beneath the vehicle. The lower wheel has a skimming action over the surface, since it has been found that the blade length seems to be "lengthened" by the dynamic air action at the tip of the teeth. Likewise, the fit of the lower wheel with the upper wheel prevents air from being pumped back out of the assembly after it is pumped into the chamber between the upper wheel and the shroud. Also, the single rear wheel is effective since it cooperates with its shroud so that it pumps air into the upper portion of the wheel while simultaneously skimming over the water with the lower portion of the wheel.

*Land vehicle modification*

Figure 7:
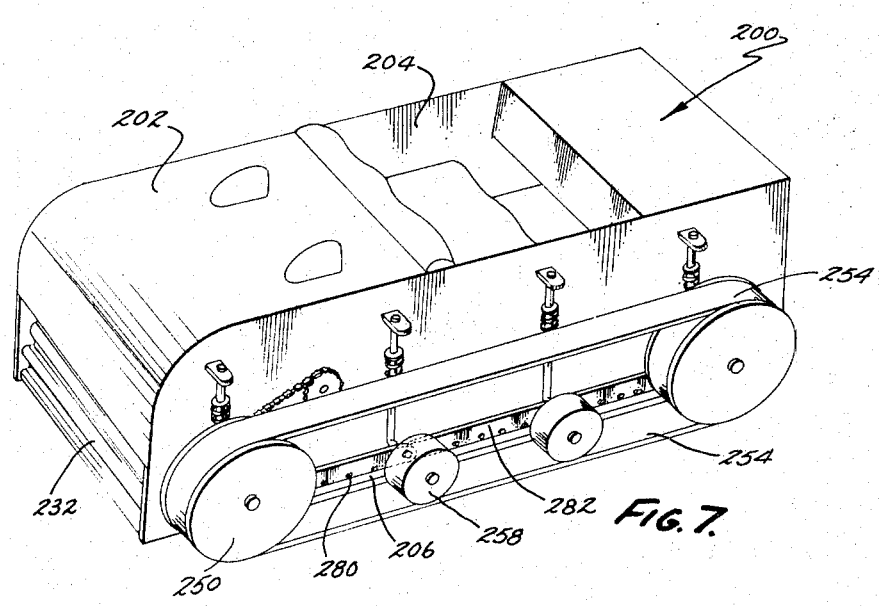
FIG. 7 is a perspective view of a third form of the vehicle especially adapted for land operation.
Figure 8:
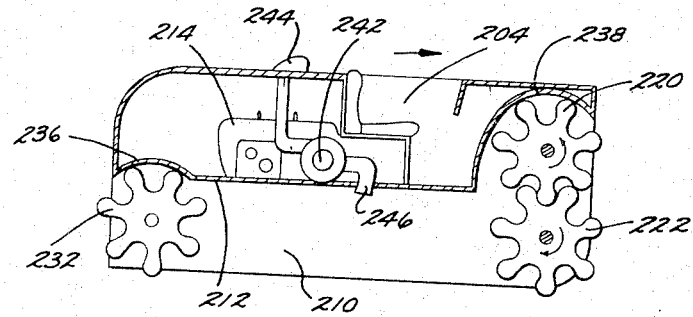
FIG. 8 is a side elevational sectional view of the vehicle in FIG. 7.
Figure 9:
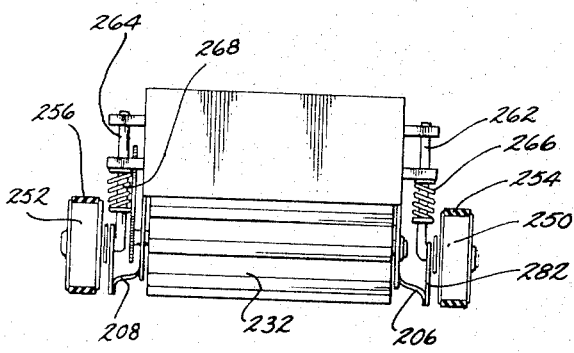
FIG. 9 is an end elevational view of the vehicle in FIGS. 7 and 8.

While the preferred forms of the invention presently is that illustrated in FIGS. 1 through 6, i.e. a water vehicle, it is conceivable that this structure could be employed in its basic concepts on a land vehicle like that illustrated at 200 in FIGS. 7, 8 and 9. This vehicle would include a body structure 202 with a passenger compartment 204. The side panels of the vehicle include lower curtains 206 and 208 which move along the ground to retain the air chamber 210 in substantially sealed relationship with minimum leakage. The vehicle includes a transverse enclosing panel 212 to seal off buoyant chamber 210 from the rest of the vehicle. It has a passenger compartment 204 and a power supply such as an internal combustion engine 214 mounted thereon. This engine drives the front gear wheels 220 and 222 in a manner described previously, using suitable drive connections such as chains to one of the axles. This also drives the rear gear wheel 232 to create a rear pumping action between the wheel and its periphery which is partially enclosed under shroud 236. This pumping action supplements the pumping action of front wheel 220 and its shroud 238.

Chamber 210 is supplied with an additional auxiliary compressed air source which may be in the form of a compressor fan 242 driven by engine 214. This pumps air from the intake 244 down through outlet 246 into chamber 210.

In order to completely seal off the side edges of the chamber, a track form of drive is employed. This track drive mechanism includes two pairs of wheels, front and rear 250 on one side and 252 on the opposite side. A pair of continuous elongated flexible track belts 254 and 256 extend around these drive wheels and around small intermediate support wheels 258. The drive from engine 214 drives these tracks.

Preferably, the tracks are spring suspended on the vertically shifting supports 262 and 264 utilizing coil springs 266 and 268 in conventional fashion.

The curtains 206 and 208 are made of a material flexible enough to move across the ground surface to be covered, but with sufficient rigidity to normally maintain the pressure inside chamber 210. Each curtain strip is held with its lower edge close to the ground but with limited abrasive action thereon by being attached by rivets 280 or the equivalent to a plurality of pivotally interconnected links 282 attached between adjacent axles for wheels 250, 258, etc. Therefore, the curtains are actually articulated with the links.

During operation, the gear wheels 232, 220 and 222 provide compressed air supply to chamber 210 to lift a substantial share of the vehicle weight off the ground, and thereby lessen the weight on the tracks.

It is conceivable that the vehicles described previously may be modified in many particulars, as far as the details are concerned, without departing from the scope of the inventive concept. Therefore, this invention is not to be limited to the particular form illustrated but only by the scope of the appended claims and the reasonable equivalents thereto.

I claim:

1. A land vehicle having a substantial portion of its weight supported on a buoyant force comprising: a vehicle body having transversely spaced depending sides, a front end and a rear end; power motor means supported by said body; said body having a panel means extending between said sides from the front end to the rear end and disposed above the bottom of said sides to form an air cushion chamber therebeneath over a major portion of said body from front to rear; a pair of intermeshed elongated gear wheels in and extending across said front end and constituting an air pressure generating means having one side in communication with the atmosphere and the other side communicating with said chamber, said pair of wheels enclosing the front end of said chamber; drive connection means between said motor means and said gear wheels to operate said wheels and create an air cushion in said chamber; and means enclosing the rear of said chamber to retain the air cushion as a buoyant force; and drive track means on opposite sides of said vehicle to form driving support means to the land surface and partial closure means alongside said chamber.

2. The vehicle in claim 1 including a pair of lateral, depending, air curtain seals forming extensions of and down from the sides of said vehicle to contact the land surface.

References Cited

UNITED STATES PATENTS

| | | | |
|---|---|---|---|
| 3,077,174 | 2/1963 | Cockerell | 180—7 |
| 3,095,938 | 7/1963 | Bertelsen | 180—7 |
| 3,185,239 | 5/1965 | Cockerell | 180—7 |
| 3,220,501 | 11/1965 | Lahde | 180—7 |

A. HARRY LEVY, *Primary Examiner.*